Figure 1:
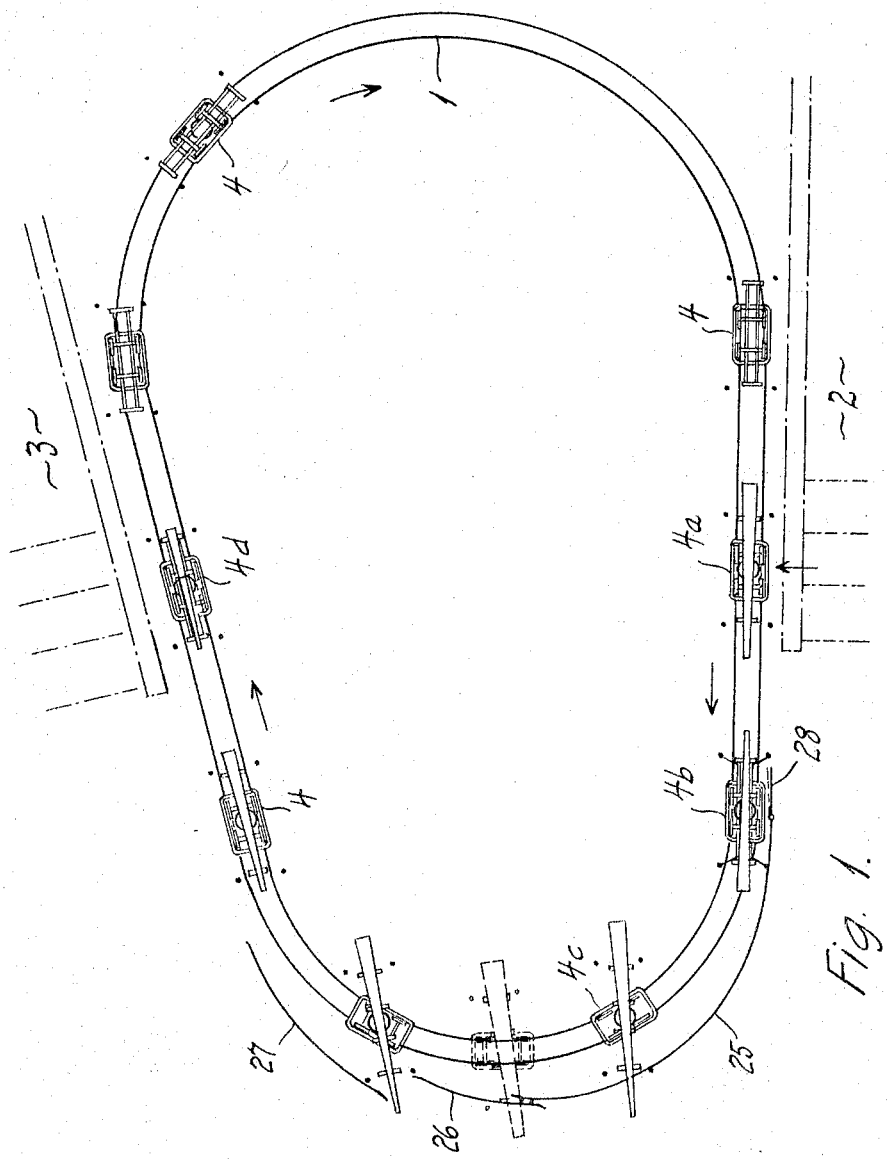

May 30, 1967 G. L. AHLSTEDT 3,322,290
CONVEYING AND ORIENTING APPARATUS
Filed Feb. 24, 1965 2 Sheets-Sheet 2

United States Patent Office 3,322,290
Patented May 30, 1967

3,322,290
CONVEYING AND ORIENTING APPARATUS
Gunnar Lennart Ahlstedt, Alfredshem, Sweden, assignor to Mo och Domsjo Aktiebolag, Ornskoldsvik, Sweden, a corporation of Sweden
Filed Feb. 24, 1965, Ser. No. 435,007
Claims priority, application Sweden, Feb. 24, 1964, 2,206/64
6 Claims. (Cl. 214—62)

In the saw mill industry there is the problem of having to transport logs from one or several loading places to one or several unloading places, in such a manner, that logs which on the loading place point with their root ends into opposite directions must be delivered to the unloading place with their root ends pointing into one and the same direction. In other industries similar problems can be found. For this purpose, normally two conveying means running between the loading and the unloading place were employed whereof one was a transverse conveyor extending in a straight line between said two places and transporting all logs which on the loading place had the right direction, and a second conveyor constructed as a rail track with cars extending between the two places along a substantially semicircular line and transporting the logs which on the loading place were wrongly oriented, so that said logs due to the semicircular course of the track arrived at the unloading place in reverse position. The known arrangement with two conveying means requires, however, much space and, moreover, involves the disadvantage that it proved difficult, because of the different length of the conveying tracks, to synchronize the speed of the conveyors so as to make a log belonging to a certain group of logs when it was wrongly oriented on the loading place to arrive at the unloading place in time to be comprised in the same group of logs as before which, for certain reasons, in many cases is an indispensable requirement.

This invention has as its object to produce a conveying system wherein the disadvantages of the known arrangements are avoided. The conveying system according to the invention is substantially characterized in that it forms a closed track at which the loading place and the unloading place are located and along which rotatable supporting means for the workpieces to be conveyed are moved, and that it comprises devices for rotating the supporting means of a workpiece wrongly oriented at the moment of loading during its displacement from the loading to the unloading place preferably automatically such, that the workpiece when it arrives at the latter place has the desired orientation.

The conveying system is preferably designed as a rail track with cars running thereon and provided with pivoted means for supporting the workpieces. Also other embodiments are, of course, imaginable, for example a chain running over a sprocket wheel, or a rope running over rope pulley, which chain or rope may carry or take along in a suitable way supporting members for the workpieces, which supporting members in their turn are pivoted so as to be capable of changing the direction of the workpieces supported thereon.

The devices for rotating the supporting means of wrongly directed workpieces may advantageously be of a purely mechanical type, i.e. they may be given the form of guide plates fixed along the track and cooperating with suitable rods or horns mounted on the cars and adapted to rotate the supporting means automatically whilst the cars are being moved along the track. It is, of course, also possible to imagine other automatically operating arrangements, for example electric arrangements, such as an electric motor mounted on each car or the like and adapted upon receiving an impulse to rotate the supporting means for the workpiece through a certain angle, usually 180°, whilst the supporting means are moving from the loading place to the unloading place.

Figure 2:
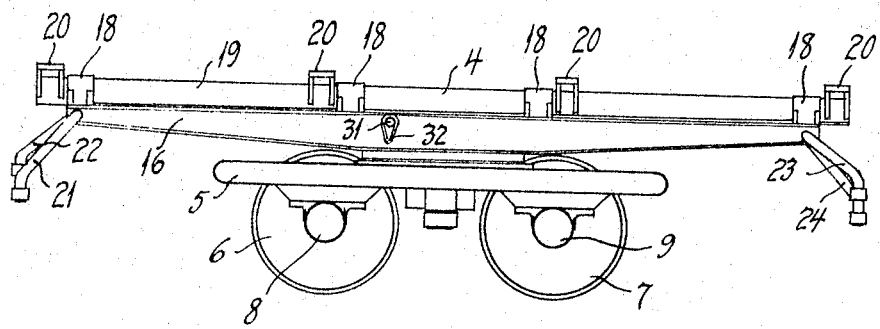
Figure 3:
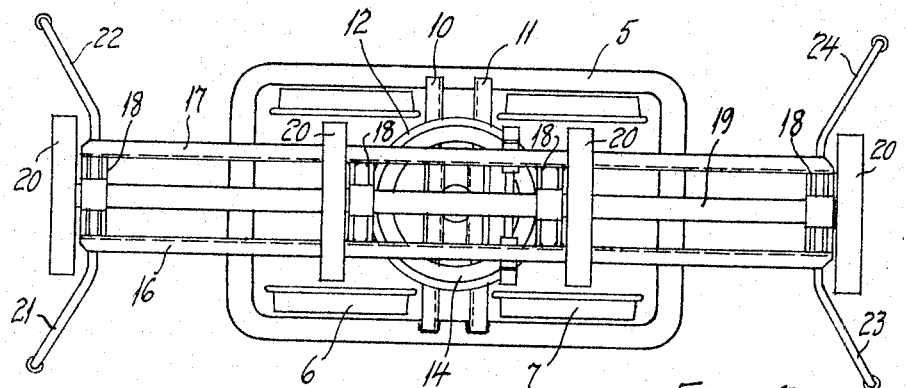
Figure 4:
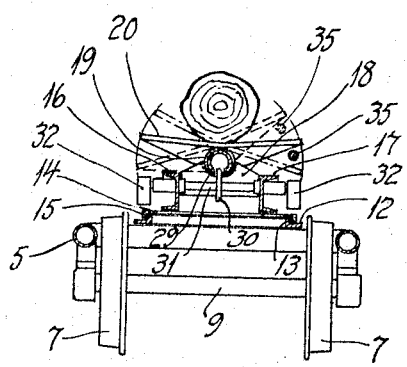

For illustrating the invention, it is referred to the embodiment shown on the accompanying drawing: FIG. 1 shows a horizontal section of a conveying system in the form of a closed rail track with cars moving thereon and carrying the workpieces to be conveyed. FIG. 2 shows a side view of a car used in the system according to FIG. 1. FIG. 3 shows a corresponding horizontal section of the car. FIG. 4 shows an end view of the car partially in section.

In FIG. 1 a closed rail track is laid out substantially in the form of an O and fitted in between two fixed stations 2 and 3 whereof 2 is assumed to be the station from which the logs are delivered (loading station) and 3 the station where the logs are received (unloading station).

On the track 1 a plurality of cars generally designated by 4 are moved in the clockwise direction. The cars are suitably connected with each other by hooks or in another expedient way and form a train extending around the entire length of the track. One of the cars in said train may be constructed as a driving car, or the driving may be effected in another suitable way. Each of said cars comprises an undercarriage consisting of a frame 5 with two wheel pairs 6 and 7 mounted on axles 8 and 9. A pair of cross beams 10 and 11 mounted close to the center of frame 5 carry an annular member 12 having an upright circular flange 13. On said annular member a ring 14 is mounted and encloses with a downwardly directed flange 15 the said upright flange 13. The ring 14, thus, can be rotated in relation to the annular member 12 and the frame 5.

Two parallel U-beams 16 and 17 mounted on the ring 14 are connected with one another by yokes 18 of suitably spaced relationship, said yokes being designed as the bearing for a tubular shaft 19 mounted in the middle between the U-beams 16 and 17, somewhat above and in parallel with the same. The shaft 19 in its turn carries a plurality of supporting or carrying members 20 spaced from one another and rigidly connected with said shaft to carry the workpieces, for example logs (FIG. 4) to be transported.

As appears from FIGS. 2 and 3, the ends of the mutually connected U-beams 16 and 17 are provided with outward-downwardly extending rods or horns 21, 22, 23 and 24 adapted for a purpose which will be explained in a greater detail in the following.

The conveying system shown which is intended to replace the two conveyors between the two fixed stations 2 and 3 mentioned in the introductory portion, has as its object to render it possible that workpieces, for example logs, loaded on the cars 4 at the loading station 2 have the desired direction when they are delivered to the receiving station 3. It, thus, shall be possible that a log pointing with its root end to the right as is the case with the log placed on the car 4 directly in front of the loading station 2, can have the same orientation when it is delivered to the unloading station 3, i.e. with its root end pointing to the right, or it may have the inverse direction, i.e. pointing with the root end to the left, seen from the same side of the car (or it may possibly have any other optional orientation).

The conveying system shown is arranged for automatically turning around wrongly oriented logs, i.e. to turn said logs through about 180° or so.

According to the invention, fixed guide plates which in the embodiment shown are three in number and designated by 25, 26 and 27 are arranged along the curved portion of track 1 whereon the cars 4 are travelling from the delivery station 2 to the receiving station 3. In the embodiment shown the guide plates are placed outside of track 1, but there is nothing which impedes their mounting on the inside of the track or possibly within the track proper between the rails. This requires, however, minor rearrangements of the remaining mechanical details.

With these guide plates cooperate the aforementioned rods or horns 21–24 mounted on the cars 4.

As appears from FIG. 2 showing a side view seen in the direction of the arrow in FIG. 1 of the car directly in front of the delivery station 2, the horns 21–24 in each pair of horns mounted at the front or rear end of the car are not arranged in identically the same manner. In FIG. 2, thus, the horn 21 shown closest to the observer projects in the front pair of horns farther downwards than the other horn 22 in the same pair, the situation being reverse for the horns 23 and 24 in the rear pair of horns.

Of the guide plates 25, 26 and 27 the central plate 26 is located so much lower than the last plate 27 that it can be passed by the shorter horn 22 (or 23 if the other end of the car is made the front end) as is explained in greater detail in the following.

The starting portion of the first guide plate 25 is provided with an adjustable point rail 28.

The operation is as follows.

When the point rail 28 is in the position indicated by continuous lines in FIG. 1 and a car 4 moves from the delivering station 2 to the receiving station 3, none of the horns 21–24 is actuated by the guide plates 25–27 (car 4b), and the log arrives at the receiving station 3 with unchanged orientation in relation to its car, i.e., for example, with its root end first if it occupied said position at the delivery station 2.

When, however, the point rail 28 is turned into the position indicated by dashed lines in FIG. 1, the procedure will be as follows.

The more forward and longer horn 21 located on the left hand when seen in the travelling direction of the car 4 (in FIG. 1 the horns are indicated by points) will abut to the outside of the guide plate 25 (car 4c) and during the continued travel of the car slide along said guide plate 25 whereby the rotary supporting means for the log will be rotated in the anti-clockwise direction relative the car. When the horn 21 arrives at a point near the finishing end of guide plate 25, the supporting means, as shown, was rotated through somewhat more than 90° in relation to the car. At the same time, the shorter horn 22 located on the right hand when seen in the travelling direction of the car, was moved into a position outside of the next guide plate 26. During the continued travel of the car the lefthand horn 22 will slide along the inside of guide plate 26, thereby effecting additional rotation of the supporting means for the log. Upon the arrival of the car 4 at the point where the lefthand horn 21 gets free of the guide plate 26, the shorter right-hand horn 22 will get into abutment to the inside of the last guide plate 27 and slide along said guide plate during the continued travel of the car, thereby completing the rotary motion of the supporting means for the log, in such a manner, that the log arrives at the receiving station in reverse position relative the car, as shown at 4d.

Instead of three guide plates 25, 26 and 27 only two of such plates may be provided, in which case the guide plates 26 and 27 can be replaced by a single guide plate. It is also imaginable to use more than three guide plates, if deemed desirable.

As the horns or rods 21–24 are arranged in like manner at both ends of the car, it makes no difference which of the ends is made the front end seen in the travelling direction. It is also possible in the two pairs of horns 21, 22 and 23, 24 to interchange the shorter horn 22 and 23 respectively with the longer horn 21 and 24 respectively, in which case instead of the front horn 21 the rear horn 24 will be the first to get into contact with the guide bar 25 and the supporting means for the log will be rotated into the direction opposite to the direction described above (clockwise direction).

The point rail 28 can be set by hand or automatically, depending on whether the log loaded on car 4 has the right or wrong orientation. In the case of right orientation, the point rail 28 is set in the position indicated by continuous lines in FIG. 1, in which case the supporting means of the car will be not be subjected to a rotary motion. For a wrongly oriented log the point rail is set into the position indicated by dashed lines, thereby effecting rotation of the supporting means in the above described manner, so that the log when it arrives at the unloading station 3 has the desired orientation.

At the unloading station 3, the logs can be removed from the cars by expedient arrangements.

As already mentioned, in the embodiment shown members 20 for supporting or carrying the logs are secured on a rotary shaft 19 extending in the longitudinal direction of the car. Said shaft is provided in one place on its lower surface with a recess 29 adapted to cooperate with a locking member having, for example, the form of an eccentric disk 30 on a transverse shaft 31 mounted in bearings in the U-beams 16 and 17, said shaft carrying at the two projecting ends short arms 32 adapted to actuate and rotate the shaft.

Upon rotating the shaft 31 the locking of the shaft 19 extending in the longitudinal direction of the car is released whereafter said shaft together with the supporting or carrying members 20 can be tipped easily into either of two directions, causing the log to roll off the car.

The arm 32 for releasing the locking can be actuated automatically by means of a stop mounted in fixed position at the unloading place 3 with which stop the arm 32 gets into contact whilst the car is travelling.

The tipping may also be effected automatically, for example by arranging at the unloading place 3 a curved rod 35 extending in the direction of the track (the starting and finishing ends of the rod are indicated in the form of sections in FIG. 4), which rod cooperates with the lower surface of the supporting or carrying member 20 farthest to the front end, in the manner indicated in FIG. 4, effects the rotary motion of the shaft 19 with the log-carrying members 20. The shaft 19 can re-assume the locked position indicated by continuous lines with the help of a similar curved rod (not shown) cooperating with the upper surface of the member 20. The shaft 31 carrying the locking member 30 may possibly be spring-actuated, in such a manner, that it is turned back automatically and locks the shaft 19 as soon as the latter has returned into its original position.

By the invention, thus, a conveying system is obtained by means of which workpieces having optional orientation when being delivered to the conveying system will be received at the unloading place with a certain predetermined orientation, while at the same time the order of the workpieces relative each other is maintained and the entire conveying procedure can be carried out completely automatically. The point rail 28 may advantageously be controlled from a sensing device connected with the point rail, which sensing device has as its object to read the direction into which the root end of the log points and to give an impulse to the point rail when turning is to be effected.

The arrangement may, of course, be modified in different ways within the scope of the claims.

I claim:

1. An apparatus for orienting objects conveyed from a loading station to a delivery station comprising, in combination, a track leading from the loading station to the delivery station; a relatively long fixed guide disposed in proximity to the track; a conveyor running on the track and having a portion rotatably mounted about a generally vertical axis relative to the track and adapted to carry an object along the track from the loading station to the delivery station; retaining means extending from the conveyor and operatively connected to the rotatably mounted portion thereof for engaging the guide to retain the rotatably mounted portion in a selected orientation relative to the track; and a movable deflector for selectively controlling engagement of the guide and the retaining means to thereby control such selected orientation.

2. An apparatus for orienting objects conveyed from a loading station to a delivery station in accordance with claim 1 in which the track has a closed configuration and includes a plurality of conveyors in the form of a train.

3. An apparatus for orienting objects conveyed from a loading station to a delivery station in accordance with claim 1 in which the retaining means are rod-like extensions which extend from the conveyor and are operatively connected to the rotatable portion thereof.

4. An apparatus for orienting objects conveyed from a loading station to a delivery station in accordance with claim 1 in which the conveyor has an undercarriage supported by a supporting means and the supporting means is adapted to pivotally tip the conveyor on its longitudinal axis to deliver objects sidewise therefrom.

5. An apparatus for orienting objects conveyed from a loading station to a delivery station in accordance with claim 1 which is adapted to automatically tip the conveyor to discharge an object carried thereon.

6. An apparatus for orienting logs conveyed from a loading station to a delivery station comprising, in combination, a track in a closed configuration leading from the loading station to the delivery station; a relatively long guide comprising a plurality of fixed guide plates disposed in proximity to the track; a conveyor running on the track and having a portion rotatably mounted about a generally vertical axis relative to the track, the conveyor being adapted to carry a log along the track from the loading station to the delivery station; rod-like retaining means extending from the conveyor and operatively connected to the rotatable mounting thereof for engaging the guide to retain said rotatably mounted portion in a selected orientation relative to the track; and a deflector movable toward and away from the track to control engagement of the retaining means and the guide plates, and thereby control such selected orientation.

References Cited

UNITED STATES PATENTS

| | | | |
|---|---|---|---|
| 2,618,207 | 11/1952 | Hery et al. | 198—33 X |
| 2,619,916 | 12/1952 | Rainier. | |
| 3,039,627 | 6/1962 | Sayre et al. | 214—44 |
| 3,167,192 | 1/1965 | Harrison et al. | 214—62 |

GERALD M. FORLENZA, *Primary Examiner.*

R. G. SHERIDAN, *Assistant Examiner.*